United States Patent Office 3,197,716
Patented July 27, 1965

3,197,716
CONTROLLED RECTIFIER RELAXATION OSCILLATOR
Maurice James Wright, Harborne, Birmingham, and Frederick Herbert Laishley, Solihull, England, assignors to Joseph Lucas (Industries) Limited, Birmingham, England
Filed Sept. 10, 1962, Ser. No. 222,387
Claims priority, application Great Britain, Sept. 18, 1961, 33,321/61
4 Claims. (Cl. 331—111)

The object of this invention is to provide an oscillatory circuit in a convenient form.

The present invention makes use of a device known as a controlled rectifier, the characteristic of which is that if a triggering pulse is applied between its gate and cathode terminals the rectifier becomes conductive, and thereafter continues to conduct, even when the triggering pulse is removed, until the anode-cathode current falls practically to zero. Furthermore, it has recently been discovered that controlled rectifiers manufactured in a certain manner have the additional property that they can be switched off by a pulse of opposite polarity (but not necessarily of equal magnitude) applied between the gate and cathode. Throughout this specification the term "switchable rectifier" is used to mean a controlled rectifier having this additional property, a convenient method of manufacturing a switchable rectifier being described in pending application No. 211,674, filed July 23, 1962.

An oscillatory circuit in accordance with the invention comprises in combination a switchable rectifier adapted for connection to a source of power and having a load in its anode-cathode circuit, a first capacitor arranged to be charged when the switchable rectifier is non-conductive, a first four-layer diode arranged to break down when the voltage across the first capacitor reaches a predetermined value, at which point the first capacitor discharges to render the switchable rectifier conductive, a second capacitor arranged to be charged when the switchable rectifier is conductive, and a second four-layer diode arranged to break down when the voltage across the second capacitor reaches a predetermined value, at which point the second capacitor discharges to render the switchable rectifier non-conductive.

Figure 1:
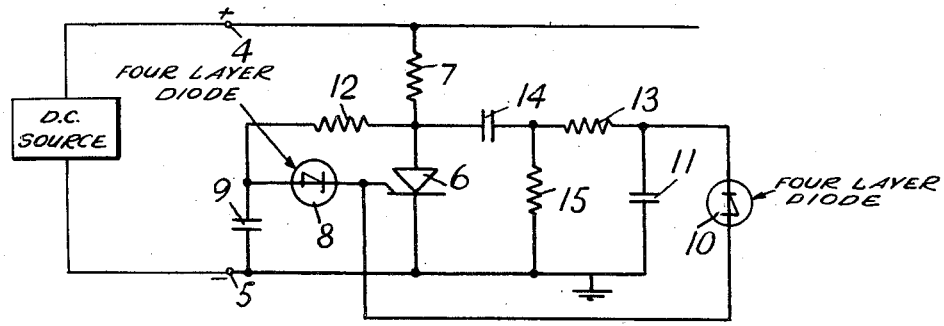
Figure 2:
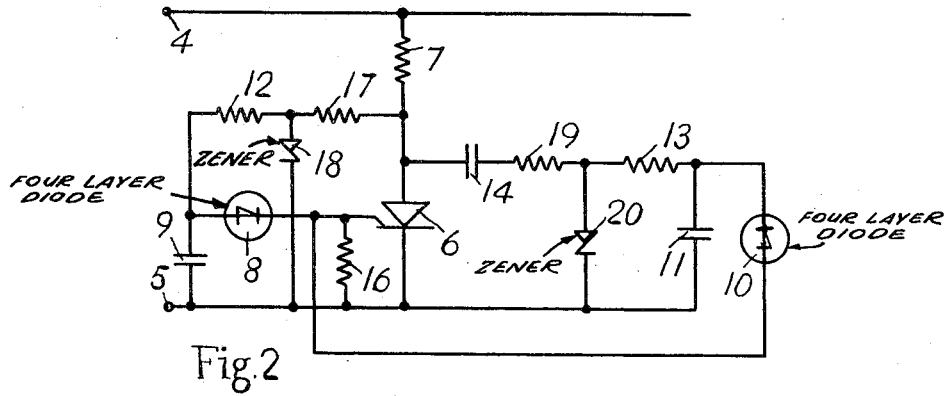
Figure 3:
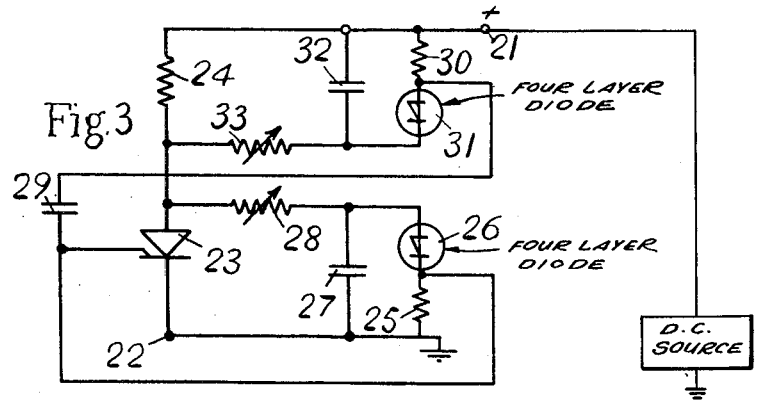

In the accompanying drawings, FIGURES 1 to 3 respectively are circuit diagrams illustrating three examples of the invention.

Referring first to FIGURE 1, there are provided first and second terminals 4, 5 adapted for connection to a source of power so as to be of relatively positive and negative polarity respectively, the terminal 5 conveniently being earthed. The terminal 5 is connected to the cathode of a switchable rectifier 6 having its anode connected to the terminal 4 through a load 7.

The gate of the switchable rectifier 6 is connected to the terminal 5 through two parallel circuits, one of which includes a four-layer diode 8 and a capacitor 9 in series, and the other of which includes a four-layer diode 10 and a capacitor 11 in series. A point intermediate the four-layer diode 8 and the capacitor 9 is connected to the anode through a resistor 12, whilst a point intermediate the four-layer diode 10 and capacitor 11 is connected to thes anode through a resistor 13 and a capacitor 14 in series. Finally, a point intermediate the resistor 13 and capacitor 14 is connected to the terminal 5 through a resistor 15, which could be replaced by a diode.

In operation, assuming that the oscillatory circuit is connected to the source of power and the switchable rectifier 6 is non-conductive, the capacitor 9 is charged until the voltage across it reaches a value at which the four-layer diode 8 breaks down. At this point the capacitor 9 discharges and renders the switchable rectifier 6 conductive.

During the non-conductive period, the capacitor 14 is also charged, and as soon as the switchable rectifier 6 is conductive the capacitor 14 discharges into the smaller capacitor 11. The voltage across the capacitor 11 rises until a value is reached at which the four-layer diode 10 breaks down, at which point discharge of the capacitor 11 renders the switchable rectifier 6 non-conductive. This cycle continues until the power source is removed.

In the modification shown in FIGURE 2, a resistor 17 is interposed between the resistor 12 and the anode, and a Zener diode 18 is connected between the terminal 5 and a point intermediate the resistors 12, 17. Moreover, a resistor 19 is interposed between the resistor 13 and the capacitor 14, and a second Zener diode 20 is connected between the terminal 5 and a point intermediate the resistors 13, 19. The additional components determine the charging voltages of the capacitors 9, 11, so that the period of the oscillatory circuit is not affected by fluctuations in the supply voltage. Preferably the gate is connected to the terminal 5 through a resistor 16.

In the example shown in FIGURE 3, there are provided terminals 21, 22 and a switchable rectifier 23 having anode and cathode connections as in the first example the load being shown at 24. The gate of the switchable rectifier 23 is connected to the terminal 22 through parallel paths one of which contains a resistor 25, and the other of which contains a four-layer diode 26 and capacitor 27 in series. Moreover, a point intermediate the four-layer diode 26 and the capacitor 27 is connected to the anode through a variable resistor 28.

The gate is connected to the terminal 21 through a capacitor 29 and a resistor 30 in series, a point intermediate the capacitor 29 and resistor 30 being connected to the terminal 21 through a four-layer diode 31 and a capacitor 32 in series. A point intermediate the four-layer diode 31 and capacitor 32 is connected to the anode through a variable resistor 33.

In operation, when the switchable rectifier 23 is non-conductive, the capacitor 27 is charged until the four-layer diode 26 breaks down, at which point discharge of the capacitor 27 renders the switchable rectifier 23 conductive. The capacitor 32 is now charged until the four-layer diode 31 breaks down, at which point discharge of the capacitor 32 renders the switchable rectifier 23 non-conductive. The lengths of the periods of conduction and non-conduction can be varied by the resistors 28, 33.

Having thus described our invention what we claim as new and desire to secure by Letters Patent is:

1. An oscillatory circuit comprising in combination terminals for connection to a D.C. source, a switchable rectifier connected in circuit with said terminals, said switchable rectifier having an anode, a cathode, and a gate, and said switchable rectifier being switched on by positive pulses applied between its gate and cathode, and being switched off by negative pulses applied between its gate and cathode, a load in the anode-cathode circuit of said switchable rectifier, a first capacitor, a charging circuit for said capacitor when said switchable rectifier is non-conductive, a first four layer diode, means connecting said first four-layer diode in circuit with said first capacitor, said first four-layer diode breaking down when the voltage across said first capacitor reaches a predetermined value, a discharge path for said capacitor through the gate and cathode of said switchable rectifier when said first four-layer diode breaks down, discharge of said first capacitor rendering said switchable rectifier conductive, a second capacitor, a charging path for said second capacitor when said switchable rectifier is conductive, a second four-layer diode, means connecting said second four-layer diode in circuit with said second capacitor, said second four-layer diode breaking down when the voltage across said second capacitor reaches a predetermined value, and a discharge path for said second capacitor through the gate and cathode of said switchable rectifier when said second four-layer diode breaks down, discharge of said second capacitor rendering said switchable rectifier non-conductive.

2. A circuit as claimed in claim 1, including a third capacitor, a charging path for said third capacitor when said switchable rectifier is non-conductive, and means whereby said third capacitor discharges to provide charging current for said second capacitor when said switchable rectifier is conductive.

3. A circuit as claimed in claim 1, including a pair of Zener diodes connected in circuit with said first and second capacitors for determining the charging voltages thereof.

4. A circuit as claimed in claim 1 including a pair of variable resistors connected in circuit with said first and second capacitors, said variable resistors determining the lengths of the periods of conduction and non-conduction of said switchable rectifier.

References Cited by the Examiner

Solid States Products, Inc.: "Applications and Circuit Design Notes," Bulletin D420–02–12–59, December 1959, pages 15–17.

ROY LAKE, *Primary Examiner.*

JOHN KOMINSKI, *Examiner.*